United States Patent [19]
Cox

[11] Patent Number: 5,956,793
[45] Date of Patent: Sep. 28, 1999

[54] FIBER OPTIC CABLE CLEANER

[75] Inventor: Larry R. Cox, St. Paul, Minn.

[73] Assignee: 3M Innovative Properties Company, St. Paul, Minn.

[21] Appl. No.: 09/191,505

[22] Filed: Nov. 13, 1998

Related U.S. Application Data

[63] Continuation of application No. 08/660,644, Jun. 7, 1996, Pat. No. 5,836,031.

[51] Int. Cl.$^6$ ...................................................... A47L 25/00
[52] U.S. Cl. ..................................... 15/104.002; 15/220.4
[58] Field of Search ........................... 15/97.1, 101, 102, 15/104.002, 210.1, 220.4

[56] References Cited

U.S. PATENT DOCUMENTS

| | | | |
|---|---|---|---|
| 3,708,818 | 1/1973 | Hotz | 15/101 |
| 4,637,089 | 1/1987 | Schwarz . | |
| 4,816,951 | 3/1989 | Zago | 15/210.1 |
| 5,117,528 | 6/1992 | Kanayama et al. | 15/210.1 |
| 5,210,647 | 5/1993 | Hartnagel et al. . | |
| 5,220,703 | 6/1993 | Kanayama et al. | 15/210.1 |
| 5,381,498 | 1/1995 | Bylander . | |
| 5,381,504 | 1/1995 | Novack et al. . | |
| 5,768,738 | 6/1998 | Lee | 15/97.1 |

FOREIGN PATENT DOCUMENTS 7-287124  10/1995  Japan .

OTHER PUBLICATIONS

"Advanced Optical Connectors for Single–Mode Fibers" by NTT Review vol. 3 (1991) May, no. 3, Tokyo, Japan, pp. 110–121 by Yasuhiro Ando, Shin–ichi Iwano, Ryo Nagase, Kazunori Kanayama, and Etsuji Sugita.

*Primary Examiner*—Terrence R. Till

[57] ABSTRACT

A device for cleaning the tips of optical fibers which have been installed in a connector, such as a plug or a receptacle. The device includes a tool body having cleaning media therein, such as a strip of adhesive tape, and a latch for releasably attaching the connector to the tool body. The adhesive tape may be in the form of a roll on a supply spool. In the embodiment designed for a plug, the tool body has an appropriately shaped opening for receiving the plug, and push rods are provided with the tool body which contact the fibers and urge them towards a cleaning position. In the embodiment designed for a receptacle, the receptacle is modified by having a tilt arm which can move the fibers to the cleaning position, and the tool body includes features to actuate the tilt arm as the tool body is inserted into the receptacle. Alternate designs are presented in which the cleaning media is not located in the tool body, but is manually applied to the fibers.

5 Claims, 9 Drawing Sheets

FIBER OPTIC CABLE CLEANER

This is a continuation of application Ser. No. 08/660,644 filed Jun. 7, 1996 now U.S. Pat. No. 5,836,031.

BACKGROUND OF THE INVENTION

1. Field of the Invention

The present invention generally relates to devices for preparing the terminal end of a telecommunications line (whether voice, data, video, etc.) so as to improve the quality of a connection in the line, and more particularly to a device for cleaning the end face of an optical fiber to be interconnected with another optical fiber or with an optoelectronic component.

2. Description of the Prior Art

Optical fibers have replaced copper wire as the preferred medium for carrying telecommunications signals. As with copper wire, it is necessary to provide for the interconnection of optical fibers, during installation, repair or replacement of the fibers, and to terminate the fibers onto active optical devices. There are generally two kinds of interconnection devices, splices and connectors. The term "splice" usually refers to a device which provides a permanent connection between a pair of optical fibers. The term "connector," in contrast, usually refers to a device which may be engaged and disengaged repeatedly, often with a different plug or receptacle. A connector may also refer to the plug portion of a fiber termination, which is attached to an optical device. Optical devices include, for example, optical sensors (photoelectric diodes) and light sources (LED's, laser diodes). The termination of an optical fiber may be indirect, i.e., the fiber may be connected to some other (passive) optical device such as a beam splitter or polarizer, before the light beam is directed to the active optical device. The present invention is generally directed to cleaning the terminal end face of an optical fiber to be used in a connector or splice, but these terms should not be construed in a limiting sense since the present invention may be used in plug and receptacle designs which provide a permanent or temporary connection or termination.

In the fiber optic connector described in U.S. Pat. No. 5,381,498, the connector has a plug and a receptacle, the plug having a fiber-receiving, V-shaped groove for each fiber to be interconnected, with the end of the fiber terminating in the middle of the groove. The receptacle has a plate which retracts as the plug is inserted, whereby another fiber is lowered into the V-groove of the plug. Upon full insertion of the plug, the two fibers ends are in contact, and the fiber secured to the receptacle is elastically deformed to maintain a continuous compressive load between the terminal ends of the fibers. The connector provides for the quick disconnection and reconnection of a plurality of optical fiber pairs, without the use of ferrules or other alignment members. High strength fiber may be used to withstand repeated insertions and bowing of the fibers. The exact lengths of fibers (i.e., the relative locations of their terminal ends in the plug and receptacle) are not critical since tolerance is provided by the slack taken up in the bowed receptacle fiber (the terminal portion of the fiber secured to the plug does not bow, but always remains straight). The ends of the fibers may be prepared by simply cleaving and beveling; the end faces may optionally be cleaved at an angle (i.e., non-orthogonal to the fiber axis) to reduce signal reflections.

In the connector of the '498 patent, it is incumbent upon the user or craftsperson installing the plug or receptacle to keep the terminal end faces of the fibers as clean as possible, to minimize losses in light transmission across the connection. Since this design is intended for repeated insertion of a plug into a receptacle, it is possible that the plug fiber ends will become contaminated while the plug is outside of the receptacle, and it is also possible for dust to enter the receptacle and contaminate the fibers therein. It therefore may become necessary to clean the fibers after they have been affixed to the plug or receptacle housing. When originally installing the fibers, they are commonly cleaved to yield a fractured end face which may be further polished or beveled, and then cleaned by wiping the end with a lint-free cloth which has been dipped in, e.g., isopropyl alcohol. This task is difficult to accomplish after installation, since in many designs, such as the '498 receptacle, the fibers are located within a housing in such a manner that they are difficult to access.

Another fiber cable cleaner, sold by Molex, is essentially a box with a window, and a spool of lint-free cloth located in the box. By opening a door at the window, a portion of the cloth is exposed such that the fibers may be pushed against the cloth surface for cleaning. This design also requires that the fibers be freely exposed.

Japanese Patent Application (Kokai) no. 7-287124 describes the use of a cleaning media to clean an optical fiber. A solvent is directed at the cleaning strips while a fiber end is held between the strips. This device, however, also requires the fiber to be exposed so that it can be inserted into the device, and further cleans the sides of the fiber but does not necessarily clean the fiber tip. It would, therefore, be desirable and advantageous to devise a fiber optic cable cleaner which not only allows cleaning of fiber end faces which are otherwise inaccessible within a connector housing, but which further avoids the use of liquid solvents that must be applied to the fibers or cleaning media.

SUMMARY OF THE INVENTION

The present invention provides a device for cleaning the tip of an optical fiber retained in a connector, the device comprising a tool body, means for releasably attaching said tool body to the connector, cleaning media located in said tool body, and means for urging the tip of the optical fiber toward said cleaning media when said tool body is attached to the connector. Different embodiments are presented for cleaning fibers in a plug versus a receptacle (socket). In either embodiment, the cleaning media is preferably an adhesive strip. The adhesive strip may be wound on a supply spool located inside the tool body; in this case, it is preferably to provide an adhesive strip that has a release layer coated on a side of the strip opposite the adhesive side of the strip, to ensure that the adhesive layer does not peel away when the spool is advanced. Advancing the spool presents a fresh surface of the cleaning media to the tip of the optical fiber. It is most preferable that the optical fiber tip be generally perpendicular to the cleaning media when the tip contacts the media.

In the plug cleaner embodiment, the tool body has an opening for receiving the plug. If the plug has a movable door thereon to provide access to the fibers, then the tool body may be provided with means for actuating the door on the plug, such as a camming surface formed at the opening of the tool body, adapted to urge the door sideways upon insertion of the plug in the opening.

In the receptacle cleaner embodiment, the tool body has a forward end whose shape is adapted for entering the opening of the receptacle. The receptacle may have therein a tilt mechanism which can lift the fibers from their normal, operative position, into a cleaning position, and in this case the tool body includes means for actuating the tilt mechanism as the tool body enters the opening of the receptacle.

Simpler implements may be provided for either a plug or receptacle to move the fibers to an accessible position whereby they can be manually cleaned with a small strip of material having an adhesive layer at the end of the strip. In these designs, no cleaning media (i.e., adhesive tape) is located inside the tool body.

BRIEF DESCRIPTION OF THE DRAWINGS

The invention will best be understood by reference to the accompanying drawings, wherein.

DESCRIPTION OF THE PREFERRED EMBODIMENT

Figure 1:
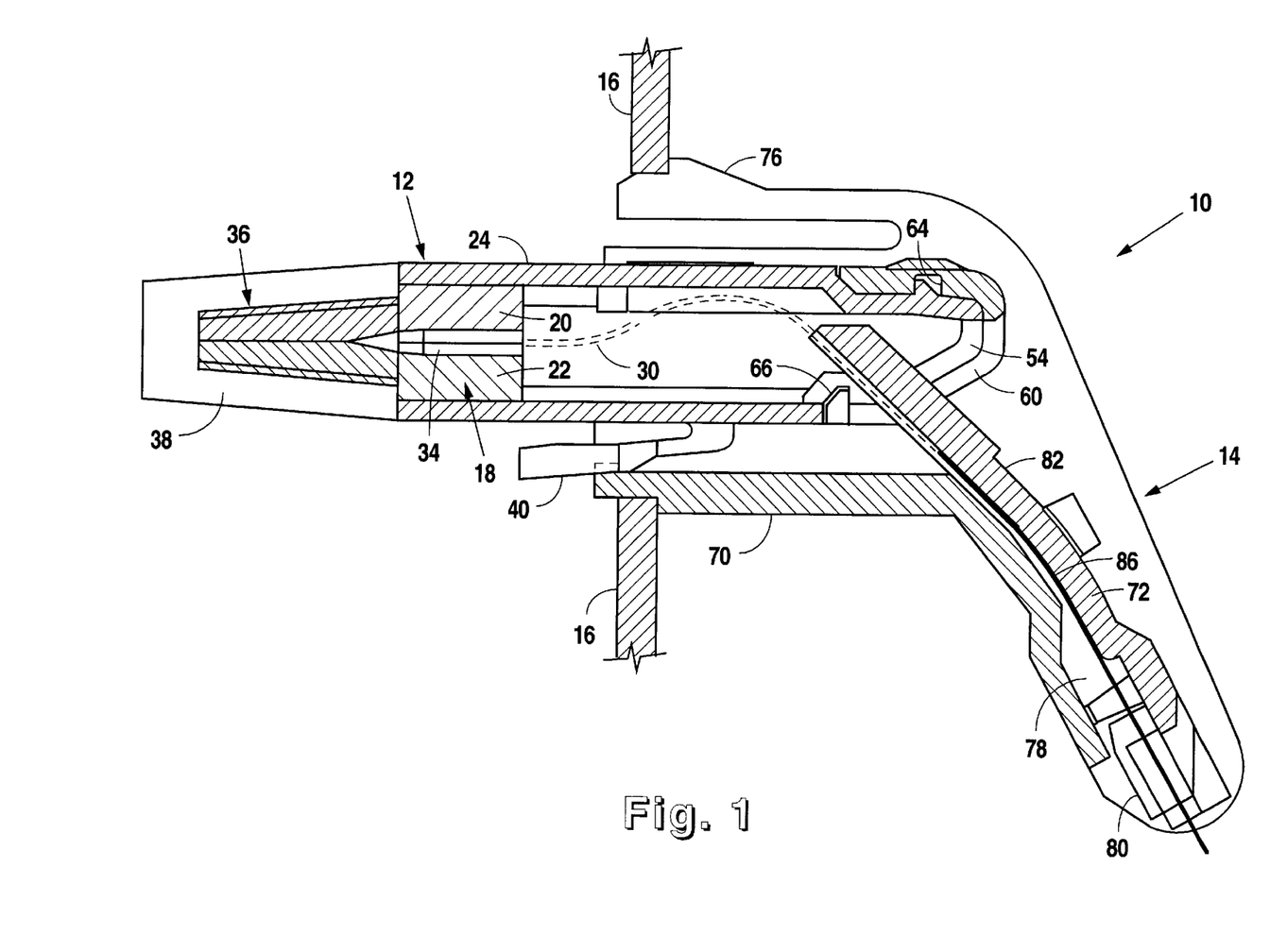
FIG. 1 is a side view of a longitudinal section of one connector which may be cleaned using the present invention, the fiber optic connector including a plug and receptacle.
Figure 2:
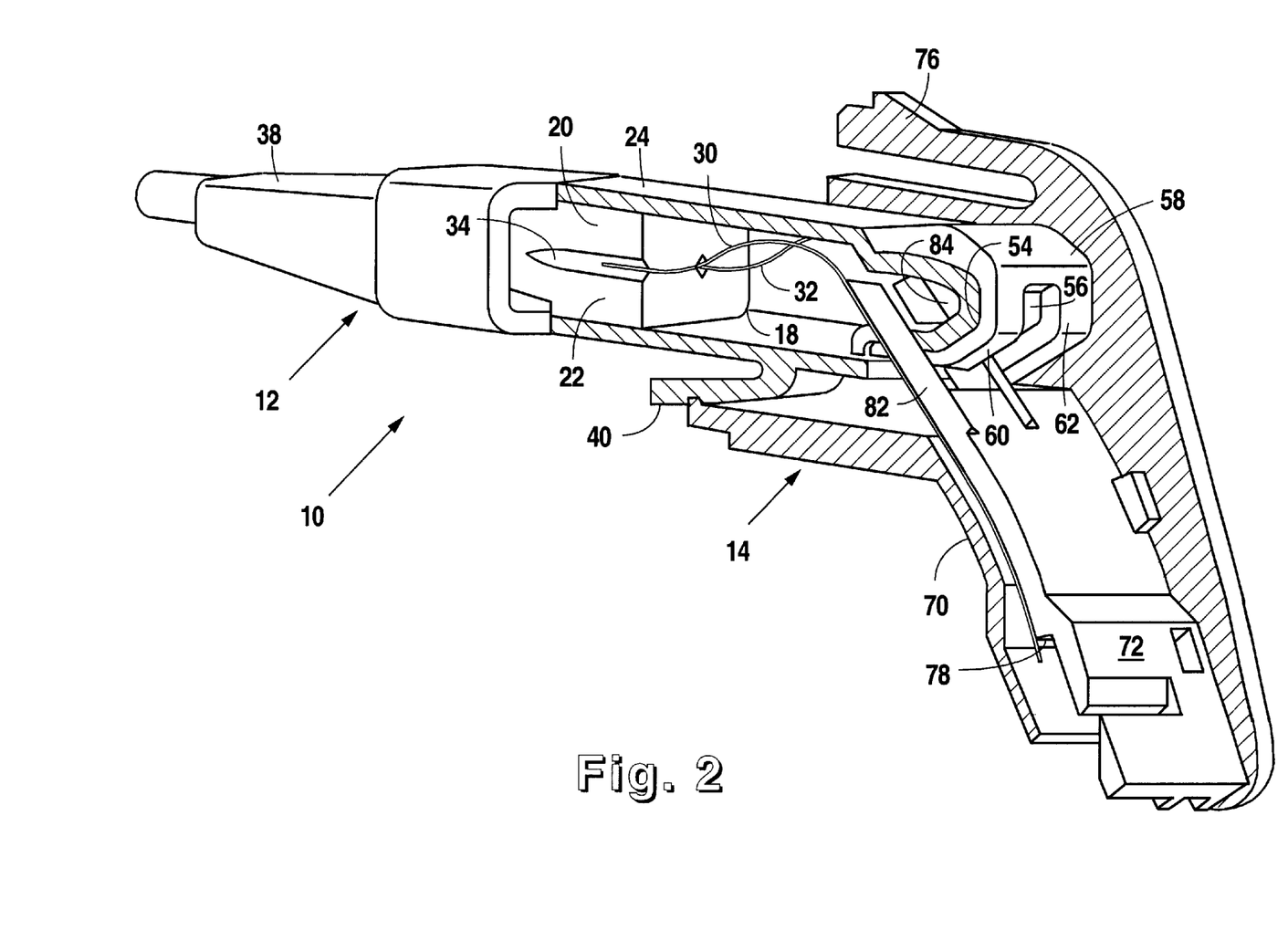
FIG. 2 is a perspective view of the plug and receptacle of FIG. 1, with a partial section revealing the bowed fibers in the plug interior.

With reference now to the figures, and in particular with reference to FIGS. 1 and 2, there is depicted a connector 10 having optical fibers whose ends may be cleaned with the fiber optic cable cleaner of the present invention. Connector 10 is generally comprised of an elongate plug 12 and a socket or receptacle 14. FIG. 1 is a longitudinal section of connector 10 showing plug 12 fully inserted in receptacle 14, and receptacle 14 mounted on a support surface or bulkhead 16. FIG. 2 is a perspective view with bulkhead 16 omitted, also with a partial longitudinal section to illustrate the interior of the connector. The depicted embodiment provides for the interconnection of two pairs of fibers, but those skilled in the art will appreciate that the inventive concepts described herein extend to single pair interconnection as well as interconnection of a multiplicity of pairs.

Figure 3:
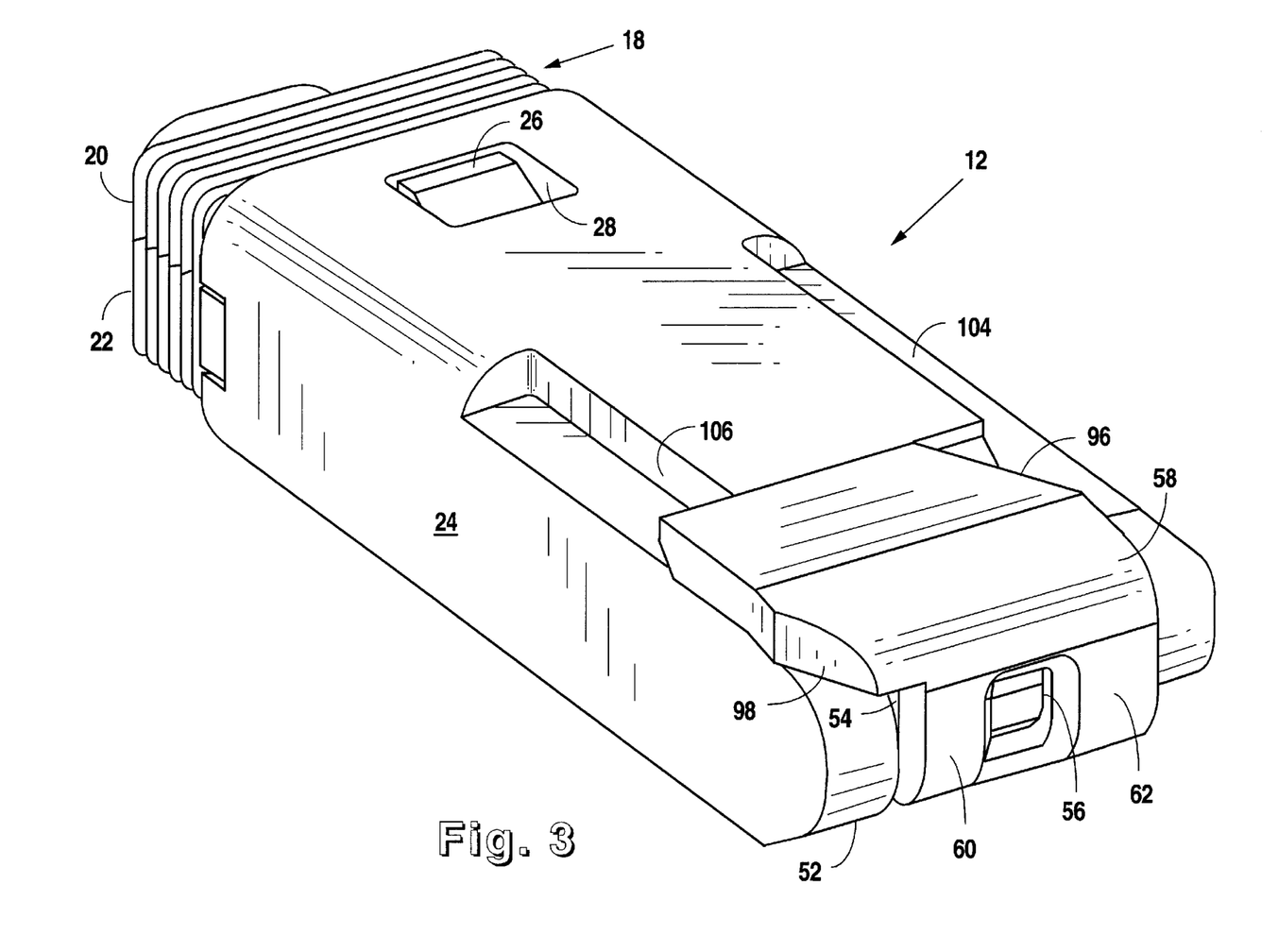
FIG. 3 is a perspective view of one embodiment of the plug used with the present connector, with a sliding door.

Plug 12, shown also in FIG. 3, includes a fiber holder 18 which may be constructed of two clamping elements or blocks 20 and 22, and a plug body or shroud 24 which is attached to fiber holder 18. Shroud 24 may be removably attached to plug fiber holder 18 by means of, e.g., latches 26 integrally molded onto blocks 20 and 22, which engage cutouts 28 formed in corresponding walls of shroud 24. Fibers 30 and 32 which are to be interconnected or terminated pass through holder 18 and into the hollow interior of shroud 24. The terminal portions of the fibers are bare, that is, they are not affixed to any alignment member such as a ferrule. Shroud 24 therefore serves not only to assist in physically locating plug 12 in receptacle 14, but also to provide protection for the otherwise exposed terminal portions of the fibers (the shroud could be made retractable to fully expose the fiber tips, if required). Holder 18 has fiber-receiving grooves 34 formed in the adjacent surfaces of blocks 20 and 22; these two components may be identical parts. Holder 18 may secure the fibers, for example, by clamping, adhesives or both. Alternative means may be used to secure the fibers to holder 18. Holder 18 may have an extension 36 surrounding the fibers for additional strain relief and clamping. A boot 38 may be provided for further strain relief and capturing of the strengthening members in the fiber cable (KEVLAR strands), and to assist in handling plug 12. The strengthening members need not be crimped but they may be adhered onto the holder. Strain relief of the strengthening members is attained by a force fit of straight-wall section of the plug fiber holder within the boot. This is dependent upon the choice of materials used for the boot and the plug fiber holder, and yields a design that does not require a crimp ring and which assists in ease of manufacture and reduces the number of needed components. Alternatively, an extension may be formed on the holder with a "torture" (irregular) path for clamping the strands and retaining the boot with an interference fit. "One-way" barbs on the surface of the plug fiber holder assist in the attachment of the boot to the plug fiber holder, which also assists in the attachment of the cable to the plug.

In the embodiment of FIGS. 1 and 2, a latch 40 is integrally molded onto one side of shroud 24 to releasably secure plug 12 to receptacle 14. Latch 40 also imparts mechanical polarization to the plug, i.e., it can only be inserted into receptacle 14 in one orientation. Plug 12 may be biased in the interconnected position, e.g., by a spring-board (a flexible cantilever) formed inside receptacle 14, to be pushed back against latch 40 to minimize the effect of manufacturing tolerances.

Figure 4:
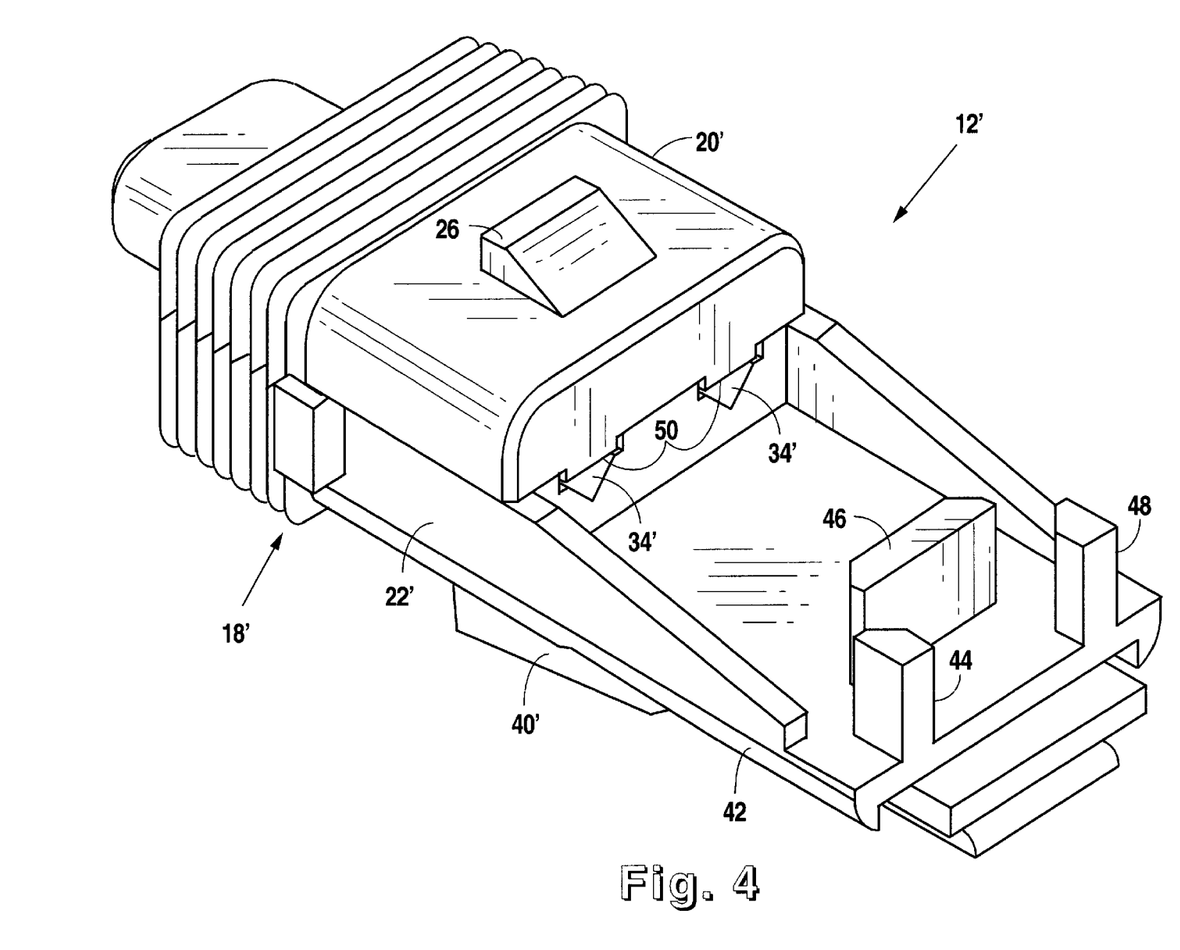
FIG. 4 is a perspective view of another embodiment of the plug used with the present connector, with the plug shroud omitted to reveal interior details.

FIG. 4 depicts a slightly different embodiment 12' of a plug. This embodiment employs a similar shroud, which is omitted from FIG. 4 to better illustrate the alternative fiber holder 18' and interior features. Holder 18' is again formed from two blocks 20' and 22', but those two blocks are not identical in this embodiment. First, block 22' has an extension or landing 42 which has several upstanding posts 44, 46 and 48. These posts serve to guide the fibers within shroud 24 in proper position for location in the V-grooves of receptacle 14 as discussed further below, and limit skewing of the fibers, ensuring proper alignment of the fiber tips with openings in shroud 24. Latch 40' is molded into block 22', along the underside of landing 42. Second, the fiber passageways in holder 18' are formed by providing V-shaped grooves 34' only in block 22', with the corresponding surface of block 20' being flat to provide only three fiber-clamping surfaces. V-grooves 34' are further recessed in block 22', and steps 50 are formed on block 20' which seat in the recesses and facilitate proper attachment of the blocks together.

Fibers 30 and 32 extend generally straight within shroud 24 whenever plug 12 (or plug 12') is not installed in receptacle 14. The fibers are "generally" straight in that they extend without significant bowing, although there might be some minute flexing of the fibers as a result of gravity. Sufficient space is provided within shroud 24, however, to allow the fibers to bow significantly, as seen in FIGS. 1 and 2, when the plug is fully inserted into the receptacle. The forward end 52 of shroud 24 has a pair of slots 54 and 56 formed therein which provide access to the terminal ends of the fibers located within shroud 24. A hood or door 58 is slidably attached to forward end 52 of shroud 24, with two covers or bars 60, 62 which overlap slots 54 and 56, respectively, when door 58 is in the closed position of FIG. 3. When door 58 slides to the open position, bars 60 and 62 move to allow access to fibers 30 and 32 via slots 54 and 56, respectively, without the need for the fibers to extend outside of shroud 24, although this would be acceptable in alternative designs. Door 58 is slidably attached to shroud 24 with a snap fit resulting from two tongue-and-groove arrangements 64 and 66 (FIG. 1). In addition to preventing dust from entering through the slots, door 58 also prevents any light in the plug fibers from escaping and injuring a user's eyes. As discussed below in conjunction with FIG. 6, door 58 may also reveal, in the open position, one or more holes on the top of shroud 24 which may receive push rods to tip the fibers out openings 54 and 56 to allow cleaning of the fiber tips.

Figure 5:
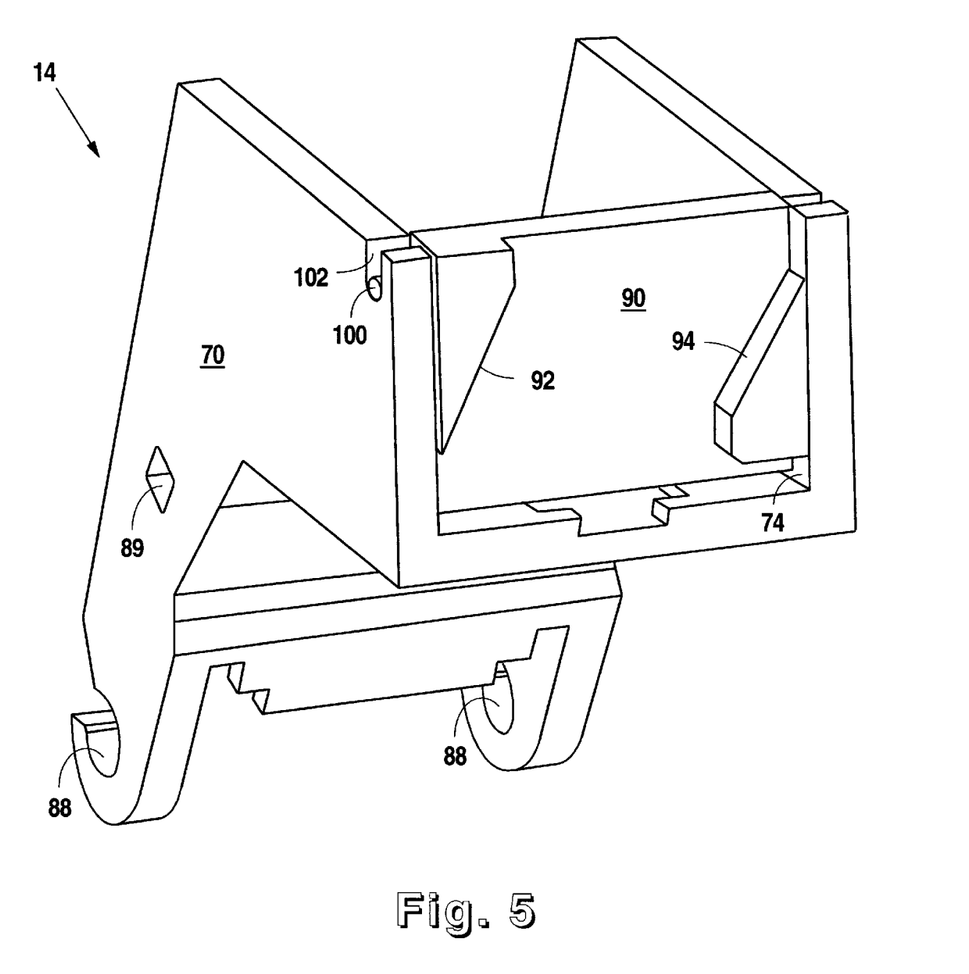
FIG. 5 is a perspective view of one embodiment of the receptacle used with the present connector, with a hinged door having camming surfaces which cooperate with camming surfaces on the plug door.

Receptacle 14, also shown in FIG. 5, includes a body or housing 70 and another fiber holder 72 (best seen in FIG. 2). Housing 70 has an opening 74 whose size and shape generally corresponds to that of the forward end 52 of plug 12. Housing 70 may also have appropriate features (such as latch arms 76) allowing it to be releasably mounted to bulkhead 16 which may be, for example, a patch panel or workstation outlet (wall box faceplate). The latch means may provide for mounting from the front of the panel, to allow all preparatory work to be done at the front side of the panel, or may provide for mounting from the rear of the panel, to allow all preparatory work to be done at the back side of the panel. The receptacle fibers (only one of which, 78, is visible in FIGS. 1 and 2) are secured to receptacle fiber holder 72 by clamping as well, using a clamping plate 80 adapted to grip the fibers at a first end of holder 72. The terminal ends of the receptacle fibers extend into fiber-alignment grooves formed in projections or fingers 82 and 84 at a second end of receptacle fiber holder 72. The grooves are preferably V-shaped, although they may be more rounded, i.e., U-shaped. An intermediate section 86 of the fiber-alignment grooves is curved so as to maintain the receptacle fibers in the grooves by the elastic urging of the slightly bowed fibers. Additional means may be provided, such as the fiber hold-down shown in FIG. 7, to retain the fibers firmly in the grooves. The fibers do not extend to the very tips of fingers 82 and 84 but rather terminate a sufficient distance from the tips to allow proper support of the plug fibers when the connector is in use. If the fiber-to-fiber contact occurs very near the tips of the V-grooves (or if the plug is inserted too far), the plug fiber can bend beyond the groove and lift away from the apex, breaking the connection.

Receptacle 14 may have as many of these fingers with fiber-alignment grooves as there are fibers in plug 12. Fingers 82 and 84 are shaped to project into slots 54 and 56, respectively, of shroud 24 when plug 12 is fully inserted into receptacle 14. Fingers 82 and 84 enter shroud 24 at an oblique (nonzero) angle with respect the plug axis, i.e., the axis defined by either of the plug fibers 30 or 32 when they are extending straight within shroud 24. This angle is preferably about 42°, which balances concerns regarding fiber end face contact pressure, fiber forces directed into the V-groove, the effects of friction, and the desired tolerance window (a larger angle increases tolerances). Since the receptacle fibers are not directed toward opening 74, there is no danger of escaping light injuring a user's eyes. Receptacle fiber holder 72 is pivotally attached to housing 70 by providing posts on the first end of holder 72 which snap into cutouts or hooks 88 formed at one end of receptacle housing 70. Holder 72 releasably locks into place using bumps or studs formed on the side of the holder, which engage holes 89 in receptacle housing 70. An alternative design for the receptacle fiber holder may be used in which the holder is molded as a single piece with a breakaway top or cover plate that can snap onto its base, the base having the fiber-positioning grooves.

Receptacle 14 may also have a flap or door 90 to minimize entry of contaminants through opening 74. The disclosed embodiment uses a receptacle door which cooperates with the plug door to actuate plug door 58 between closed and open states as plug 12 is inserted into receptacle 14. Specifically, receptacle door 90 has two camming surfaces 92 and 94 which interact with camming surfaces 96 and 98, respectively, on plug door 58. Receptacle door 90 is hinged along one edge by providing posts 100 that snap into cutouts 102 in receptacle housing 70. Means (not shown), such as a spring or camming linkages molded into the part, may be used to bias door 90 in the closed position. When plug 12 is inserted into receptacle 14, forward end 52 and plug door 58 push against receptacle door 90, raising and opening it. The ramped camming surface 94 then begins to forcibly abut camming surface 98 on plug door 58, pushing door 58 to the side to reveal slots 54 and 56. If plug 12 is thereafter removed from receptacle 14, then ramped camming surface 92 similarly pushes against camming surface 96 as the plug is removed, sliding plug door 58 back into its closed position. Shroud 24 has grooves or indentations 104 and 106 to accommodate camming surfaces 92 and 94 when the plug is in the receptacle, which also serve to further stabilize the connection. Other door designs may be implemented with receptacle 14, such as a door which manually opened outward and snapped shut.

All of the components of connector 10 (except plug boot 38) may be formed of any durable material, preferably an injection moldable polymer such as polycarbonate, VALOX (a polyester sold by General Electric), or RADEL (a polyarylsulfone sold by Amoco). The material may include conductive fillers to render the components semiconductive in order to minimize triboelectric charging which can induce fiber end contamination. Boot 38 is preferably formed of low modulus copolyester elastomer such as that available from RTP of Winona, Minn., under material number 1559X67420B.

Assembly and installation of connector 10 is straightforward. Plug 12 is typically assembled in the factory, although it may easily be assembled in the field. In this regard, the term "pre-terminated" as used herein simply refers to the attachment of optical fibers to plug 12 or receptacle 14 regardless of whether such attachment occurs in the factory, the field, or elsewhere. It is also understood that plug 12 or receptacle 14 could be mounted on a jumper cable or patch cord with any kind of optical connector at the other end of the fibers. It is recommended that fibers be used which have a longer life when exposed to indoor environments, such as the high-strength fibers available from Minnesota Mining and Manufacturing Co. (3M—assignee of the present invention). Those fibers have a conventional core and cladding which is surrounded by a novel three-layer construction, as discussed in U.S. Pat. No. 5,381,504. Those skilled in the art will also appreciate that the connector can accommodate discrete optical fibers or multifiber ribbons, as well as both singlemode and multimode fibers, and that the cleaning device discussed below can be used with any such configurations.

Fibers which are to be pre-terminated to either plug 12 or receptacle 14 should be stripped, cleaved and cleaned. If the fibers are in the form of a ribbon which is part of a bundled group of ribbons in a cable, then a portion of the cable jacket must first be cut back to reveal the ribbons. Most cables have several protective layers, and each of these layers must be removed to provide access to the fiber ribbons. Similar steps must be taken to remove the protective layers of a cable having a single discrete fiber. After the fibers have been removed from the protective cable jacket, they are stripped. The stripped fibers are then ready for cleaving which may be accomplished using any one of several commercially available fiber cleavers, such as that shown in U.S. Pat. No. 5,024,363. The cleave length for attachment of the fibers to plug 12 is the distance from fiber holder 18 which is about 23 mm. For attachment of fibers to receptacle 14, the cleave length is the distance from fiber holder 72 which is about 15 mm. Any debris should be cleaned off the fibers using a lint-free cloth dipped in alcohol. Prior to removing the fibers from the cleaver, the craftsperson may inspect the fibers to confirm that the end faces on all fibers are acceptable, i.e., that they are smooth cleaves with no spikes. The fiber viewer disclosed in U.S. Pat. No. 5,210,647 may be used for this purpose. Once the craftsperson is satisfied that each of the fibers has an acceptable end face, the fibers may be removed from the cleaver. The fiber end faces are preferably flat with a chamfered or beveled periphery (or at least partially beveled) to obtain the advantages associated with such a fiber end profile, as discussed more thoroughly in U.S. patent application Ser. No. 08/122,755. The fiber end faces may alternatively be radiused (generally spherical). The fibers may further optionally be provided with an asymmetric treatment, like cleaving so as to impart an angled end face, as taught in U.S. Pat. No. 5,048,908. If so, in order to minimize insertion losses and reflections, the fibers should be inserted so that the orientation of the angled end faces of one set of fibers (i.e., in plug 12) complements the orientation of the angled end faces of the other set of fibers (i.e., in receptacle 14). For the plug fibers, fiber preparation may be done after the fiber cable has been threaded through boot 38.

Final assembly of plug 12 comprises the simple steps of clamping the fibers in the V-grooves of holder 18 and snapping shroud 24 onto holder 18. An assembly fixture may be used to guide shroud 24 onto the plug fiber holder so as to avoid damaging the fibers as they are inserted into the shroud. The ends of the plug fibers should terminate about 0.5 mm from the end of the shroud. Completion of receptacle 14 is also simple. The receptacle fibers are clamped onto fiber holder 72 using clamping plate 80, with the ends of the receptacle fibers terminating in the fiber-alignment grooves about 15 mm from the tips of fingers 82 and 84. The receptacle fibers may be cleaved after securing them to the fiber holder. The fibers may be assembled into the holder using the V-groove to actually pick up the fiber holder from the cleaver, to avoid contamination of the fiber tips, if mating and guiding features are provided on one or both parts. A punch-down tool could also be used to simplify assembly. Fiber holder 72 is attached to housing 70, first by pushing the pivot posts into cutouts 88, and then snapping the studs into holes 89. Care should be taken during placement of the fibers in the V-grooves and attachment of the holder to the receptacle to not contaminate the fiber tips.

Installation of connector 10 is equally straightforward. Receptacle 14 is optionally mounted to any desired surface by convenient means, such as latching arms 76 (other constructions could be molded into housing 70 for custom mounting). Several receptacles could also be mounted in a single module, and they can be designed for front or rear loading, or sliding from the side. After receptacle 14 is mounted, the connection is completed by simply inserting plug 12 into opening 74. Plug 12 is released from receptacle 14 by latch 40.

FIGS. 1 and 2 depict full insertion of the plug. As plug 12 is inserted, door 90 opens and cams door 58 open as described above, allowing fingers 82 and 84 to enter slots 54 and 56 respectively. Plug fibers 30 and 32 contact the fiber-alignment grooves in fiber holder 72, and slide until their end faces abut the respective end faces of the receptacle fibers, and then become bowed when the plug is fully inserted. The plug fibers may undergo an S-shaped bend. All force at the fiber-to-fiber interface comes from the resilience (elastic deformation) of bowed fibers 30 and 32 which maintains a continuous compressive load between the ends. Connector 10 is preferably designed to maintain a minimum bend radius of 0.3" on the fibers.

The dimensions of the various components of connector 10 may vary considerably depending upon the desired application. The following approximate dimensions are considered exemplary. Plug 12 has an overall length of 57 mm, a width of 12 mm, and a thickness of 8 mm, and plug fiber holder 18 provides clamping grooves that are 13 mm long. Plug shroud 24 extends 25 mm beyond holder 18, providing an interior space which is 24 mm long, 10 mm wide and 6 mm high. Opening 74 of receptacle 14 is 12 mm×10 mm. Its overall height and depth are 38 mm and 36 mm. Receptacle fiber holder 72 is 20 mm long (from the end where the fibers are clamped to the tips of fingers 82 and 84), 12 mm wide and 1.5 mm thick. The fiber-alignment grooves in fingers 82 and 84 are 11.5 mm long and have a maximum depth of 2 mm which suitably accommodates most conventional optical fibers. The interior angle of the V-grooves should not be too narrow since this might result in excess friction with the fibers, but it also should not be too wide since this would not keep the fibers guided properly. A 90° interior angle is believed to be a good compromise.

Figure 6:
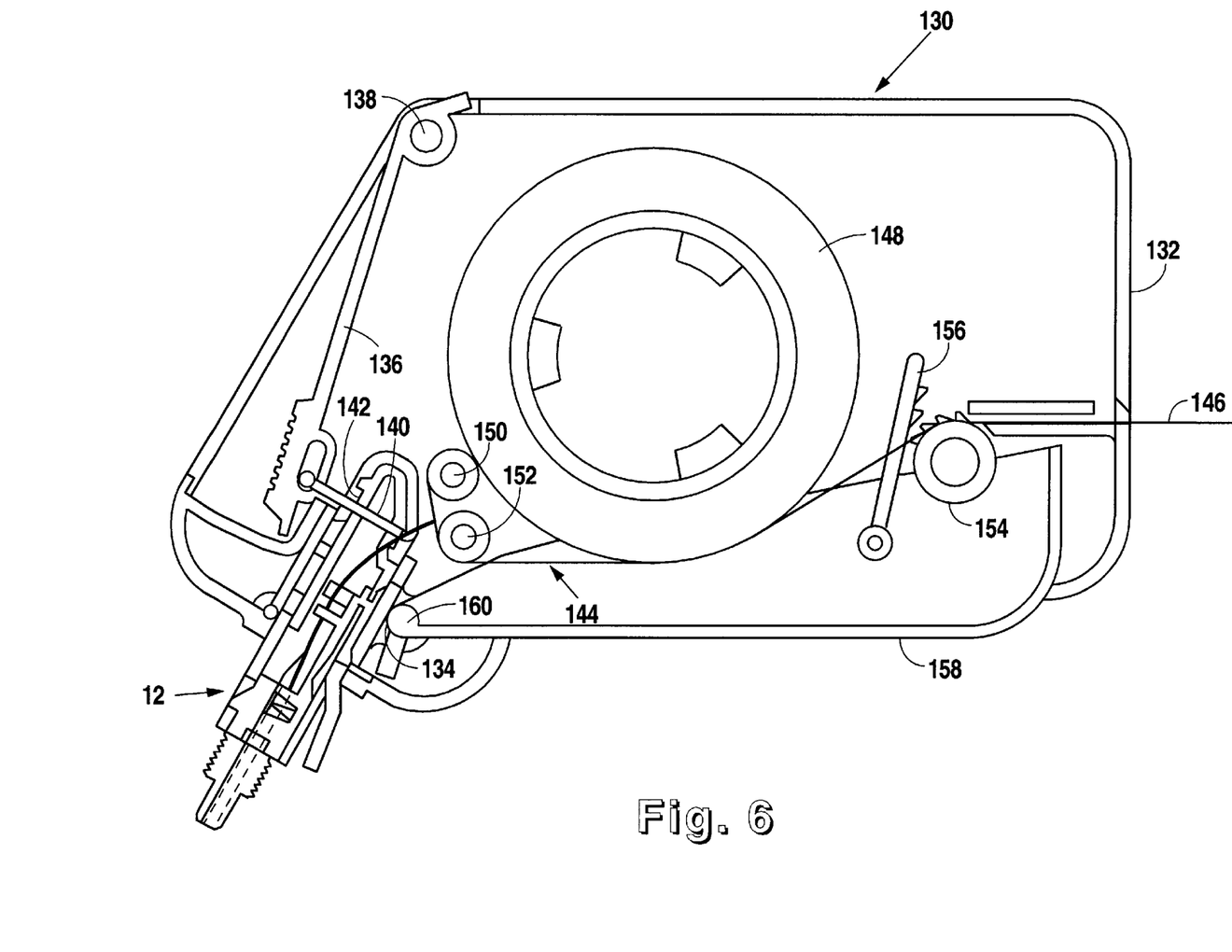
FIG. 6 is a sectional view of a tool used to clean the tips of the fibers in a plug.
Figures 7, 7A:
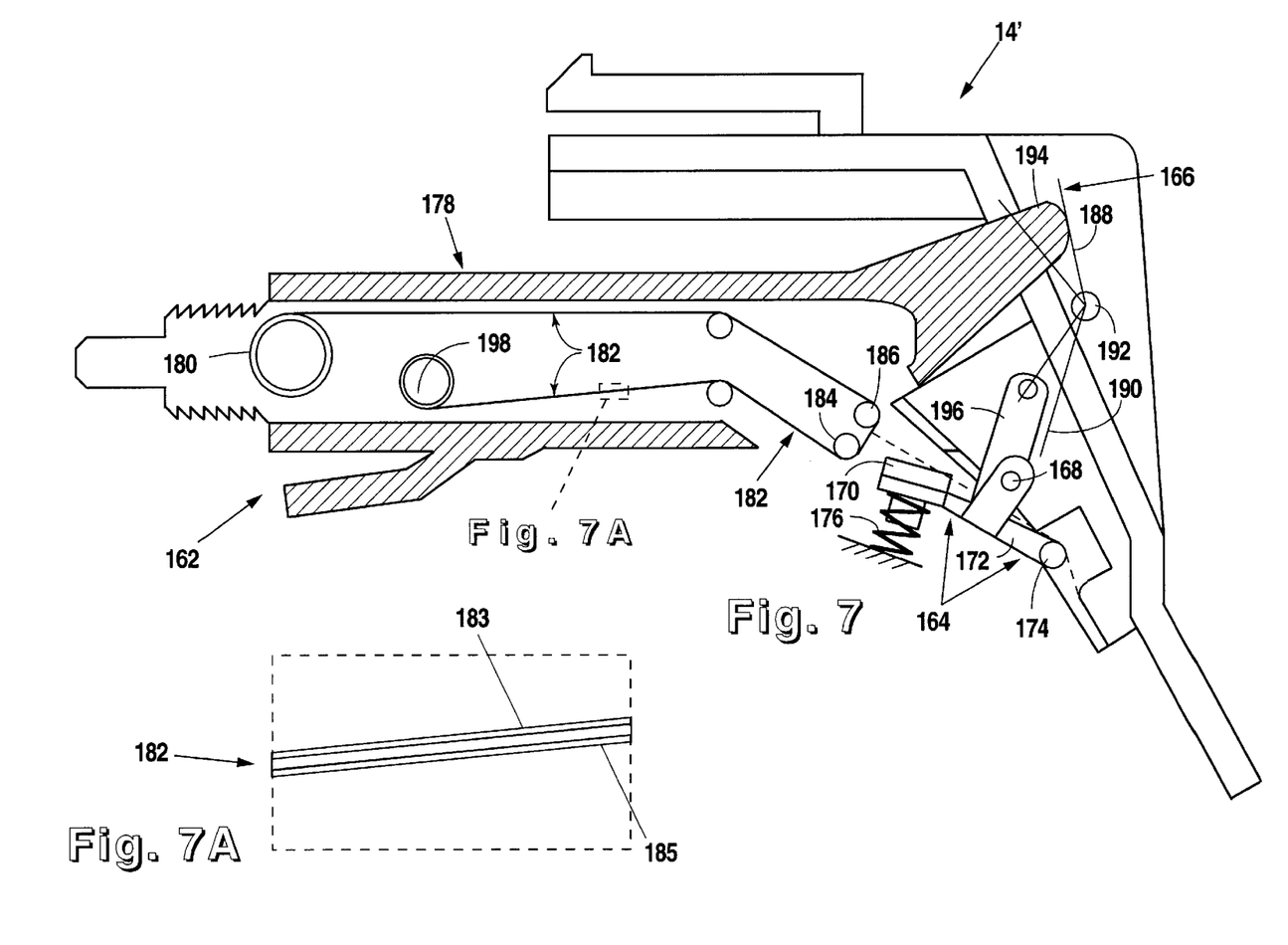
FIG. 7 is a sectional view of a tool used to clean the tips of the fibers in a modified receptacle.
FIG. 7A is a blow-up of section 179 of FIG. 7.

With further reference to FIGS. 6 and 7, those figures depict tools according to the present invention, used to clean the tips of the various optical fibers. FIG. 6 shows a tool 130 used to clean the tips of the fibers in plug 12. Tool 130 has a body 132 adapted to be held in the hand, with an opening 134 in body 132 for receiving plug 12. Tool 130 also has an actuation member or lever 136 pivotally attached to body 130 at 138. In FIG. 6, lever 136 is shown in the actuated position, in which state a push rod or tab 140 enters a hole or slot 142 in the top of the plug shroud, and contacts the plug fibers, forcing the fiber ends out of the shroud through slots 54, 56. In the unactuated position, lever 136 swings away from opening 132 and retracts push tab 140 so that plug 12 can enter tool 130 without interfering with the push tab. Lever 136 is preferably biased toward the unactuated position by, e.g., a spring.

Opening 134 and lever 136 are located such that the plug fibers, when pushed through the shroud slots, are forcibly abutted against the adhesive side 144 of a strip of tape 146. Tape 146 is peeled away from a tape roll 148 which is stored in tool body 132. Two rollers 150 and 152 are provided to allow the tape to advance so that a fresh adhesive surface is presented to the fiber tips. To facilitate use, tape 146 may be wound about another roller 154 forming a ratchet wheel which engages a pawl 156. Pawl 156 is in turn located on another handle or pivoting lever 158 attached to tool body at 160. In this manner, the user may advance the tape and clean the plug fibers by squeezing handle 158 while holding the tool. Handle 158 may also be biased by, e.g., a spring, toward the outermost position. In an alternate embodiment, lever 136 may be mechanically linked to rollers 150 and 152 such that the adhesive tape is presented to the fiber tip in a generally perpendicular orientation, such that the fiber is not dragged across the adhesive surface, but rather only the very end of the tip is touched to the adhesive surface.

FIG. 7 shows a tool 162 used to clean the tips of the fibers in a modified receptacle 14'. The shape of tool 162 is reminiscent of plug 12, whereby it is adapted to be inserted into receptacle 14' in a similar manner. Receptacle 14' is generally identical to receptacle 14, except for the provision of certain features designed to raise the receptacle fibers up out of the V-grooves for cleaning. These features include a fiber hold-down or retainer 164 and a tilt linkage 166. Fiber retainer 164 is pivotally attached to the fiber holder at 168, and includes a block or pad 170 located at one end of the retainer arm 172 adapted to push the fibers into the V-groove and keep them nested properly therein. Pad 170 may be molded into the fiber hold-down. The other end of retainer arm 172 has formed thereon a boss or button 174 which pushes against the receptacle fibers when retainer arm 172 is in the actuated position, as shown in FIG. 7. Pushing of the fibers by boss 174 causes the fibers to deflect out of the V-grooves. Fiber retainer 164 is preferably biased, e.g., by a spring 176, toward the unactuated position, i.e., pushing pad 170 against the fibers to maintain them in the V-grooves.

Tool 162 includes a body 178 which, like tool 130, also houses a supply spool 180 of adhesive tape 182. Rollers 184 and 186 serve to position tape 182 such that its adhesive side can again be advanced to clean the fiber tips. The fibers are deflected when tool 162 enters receptacle 14' by means of tilt linkage 166, which includes two tilt arms 188 and 190 fixed together at another pivot point 192. A projection or actuator bump 194 formed on the front end of tool 162 pushes against tilt arm 188 as the tool is inserted into the receptacle. This in turn causes tilt arm 190 to rotate and push against a catch or finger 196 attached to fiber retainer 164. Forcible contact between tilt arm 190 and finger 196 causes fiber retainer 164 to pivot about point 168, thereby pushing boss 174 against the fibers and deflecting them out of the V-grooves. Tape 182 in tool 162 may be taken-up on another spool 198, or exit tool body 178 in a manner similar to that shown in FIG. 6 for tool 130. As seen in FIG. 7A, which is a blown-up view of section 179 of tape 182 in FIG. 7, one side of the tape 182 is coated with a release layer 183, and the other side is coated with an adhesive layer 185. A small dial or twist rod may be attached to take-up spool 198 and extend outside of body 178 to allow the user to advance the tape.

Figure 8:
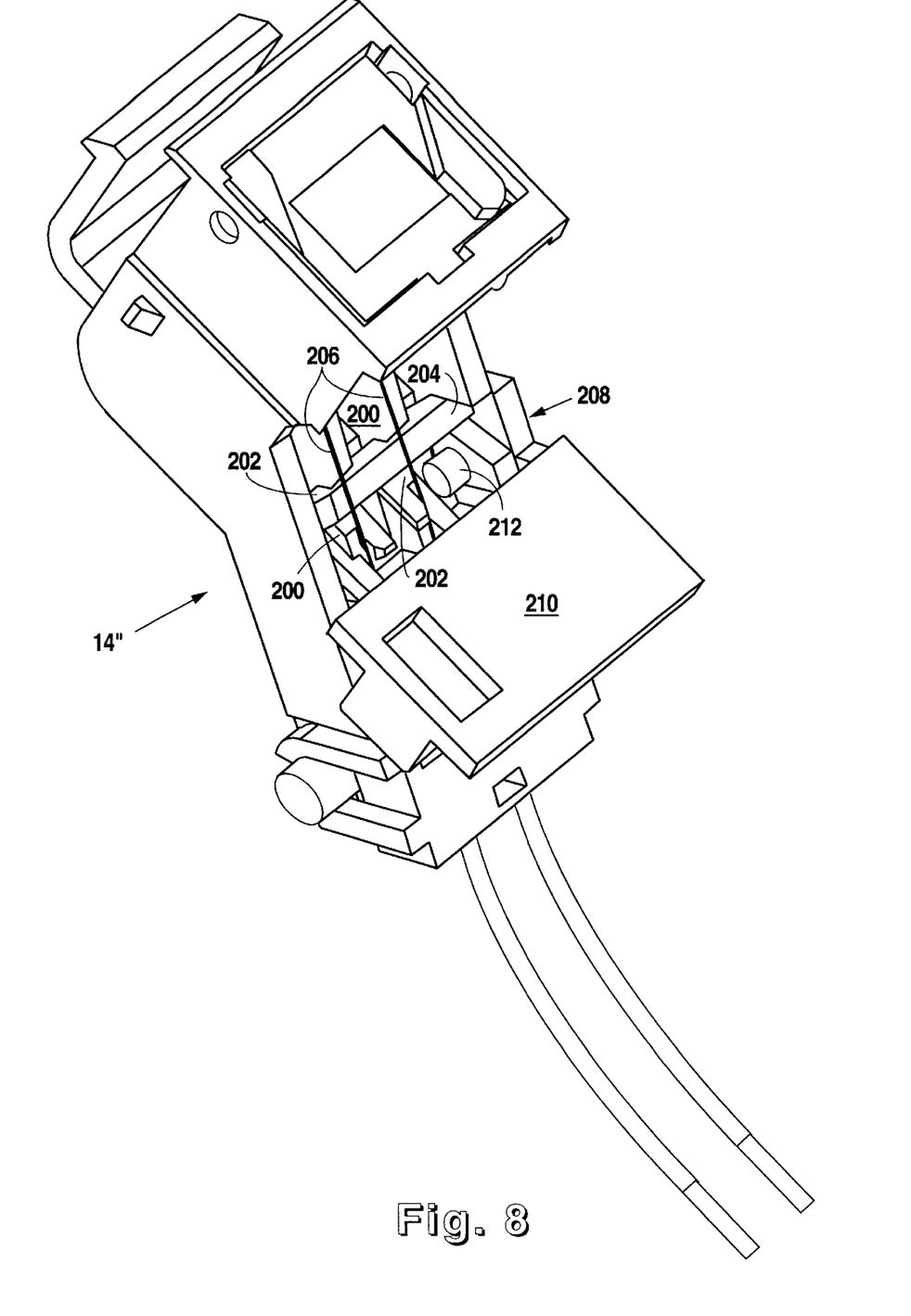
FIG. 8 is perspective view of another modified receptacle having a fiber positioning piece for cleaning.

Another modified receptacle 14" shown in FIG. 8 also has a mechanism to move the fibers from their operative position to a cleaning position. In the embodiment of FIG. 8, however, the fibers are lifted from underneath the V-grooves, rather than being pushed near a rearward portion of the fibers as in FIG. 7.

Specifically, receptacle 14" has groove structures 200 which include cutouts or notches 202 such that the fibers span notches, and a fingerlike projection, or arm, 204 lies in notches 202. Arm 204 may be raised, however, which lifts the fibers out of V-grooves 206 in a cleaning position, similar to that shown in FIG. 7. In the embodiment of FIG. 8, arm 204 is part of a fiber positioning piece 208 which also includes another arm or actuation lever 210, and a trunnion or pivot pin 212. The lower half of the receptacle housing must be repositioned or pivoted to allow temporary placement of the fiber positioning piece 208. Arm 204, actuation lever 210 and pivot pin 212 are preferably integrally molded of the same material as the housing of receptacle 14", and fiber positioning piece 208 is attached by passing pin 212 through a hole in the side of the receptacle housing. In this manner, when lever 210 is depressed, arm 204 will raise the fibers. An adhesive tipped applicator is manually positioned to facilitate cleaning of the fiber end face. The applicator is preferably flexible (to prevent mechanically damaging the fiber), and clear or transparent to allow viewing of the fiber as the adhesive tip of the applicator is brought into contact with the fiber end face.

Figure 9:
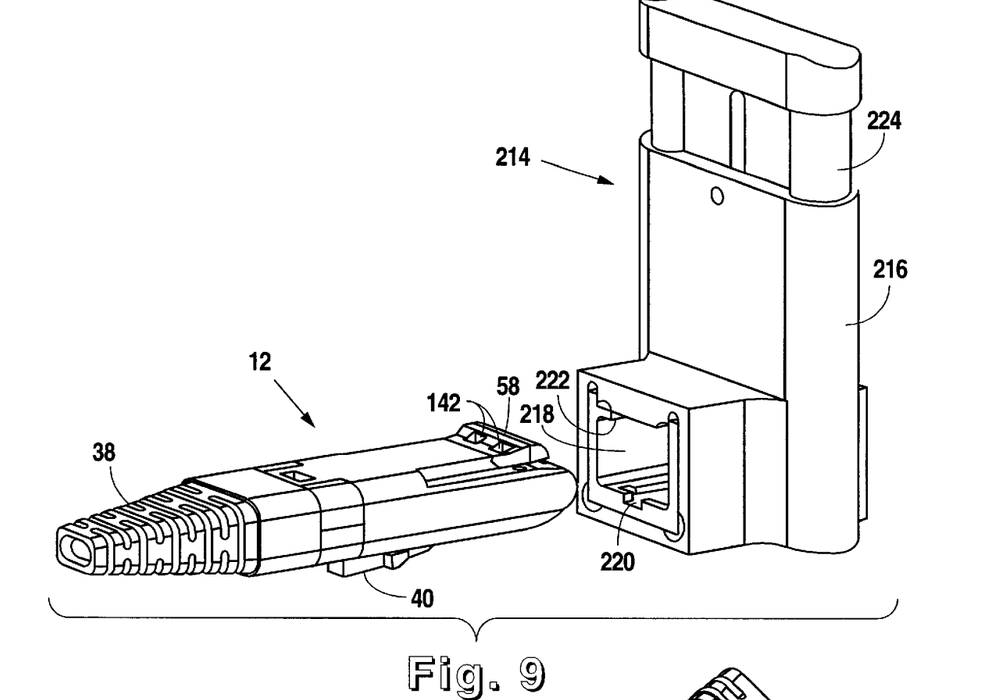
FIG. 9 is perspective view showing insertion of a plug into an alternate cable cleaner.
Figure 10:
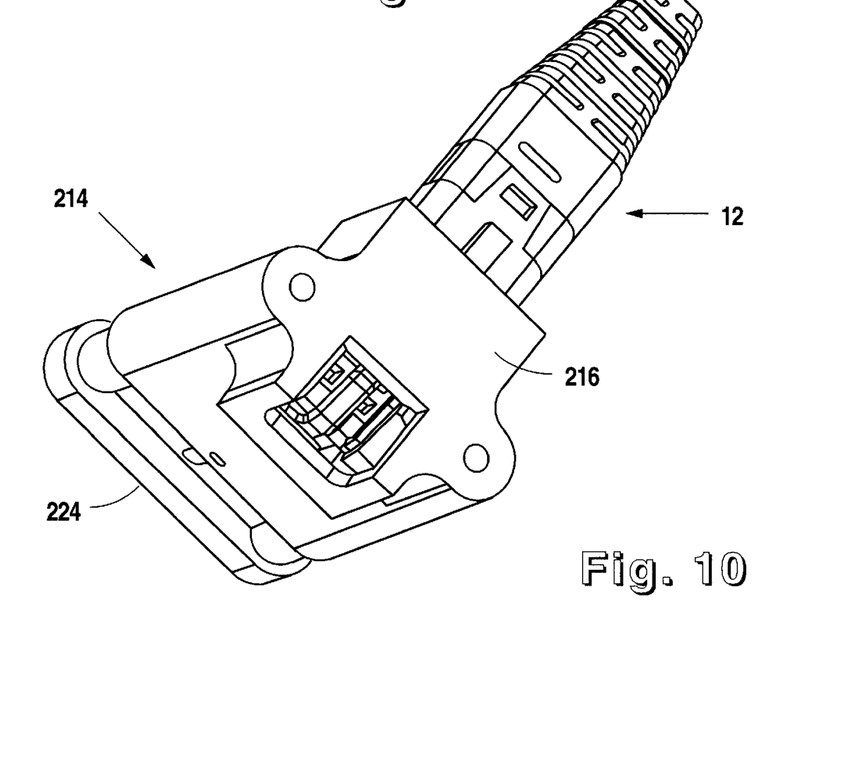
FIG. 10 is rear perspective view showing the plug fully inserted into the cable cleaner of FIG. 9.

FIGS. 9 and 10 depict a modified cable cleaner for a plug, wherein the device still includes means for moving the tip of the fiber from an operative position to a cleaning position, but there is no cleaning media stored within the cable cleaner housing. Instead, an adhesive strip is again manually touched to the tips of the fibers, as with the device of FIG. 8. The plug cleaner 214 of FIGS. 9 and 10 includes a tool body 216 having an opening 218 for receiving plug 12, and appropriate features such as that indicated at 220 to ensure that the plug is properly oriented and retained in body 216. A camming surface 222 is again provided to move door 58 of plug 12 sideways as the plug is inserted, so that the fibers therein may be accessed. Plug cleaner 214 further has an actuation member 224 slidably mounted in body 216. Actuation member 224 has push rods, similar to push rods 140 (see FIG. 8), and when actuation member 224 is fully inserted into body 216, the rods enter holes 142 on door 58 and contact the fibers, urging them out of the plug body. The fibers are then exposed through another opening 226 on the opposite side of body 216 (FIG. 10). The push rods preferably have V-shaped notches to control the outward movement of the fibers.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. For example, the cable cleaners are described for use with a connector in which the terminal portion of the fiber is bare and flexible, but the cleaner could easily be adapted to clean the ends of ferrule connectors as well. It is therefore contemplated that such modifications can be made without departing from the spirit or scope of the present invention as defined in the appended claims.

I claim:

1. A device for cleaning the tip of an optical fiber retained in a receptacle having an opening, the device comprising:

a tool body having a forward end whose shape is adapted for entering the opening of the receptacle;

means for releasably attaching said tool body to the receptacle;

cleaning media located in said tool body; and means for urging the tip of the optical fiber toward said cleaning media when said tool body is attached to the receptacle.

2. The device of claim 1 wherein said cleaning media comprises an adhesive strip.

3. The device of claim 2 wherein said adhesive strip is wound on a supply spool located in said tool body, and said adhesive strip has a release layer coated on a side of said strip opposite an adhesive side of said strip.

4. The device of claim 1 further comprising means for moving said cleaning media such that a fresh surface of said cleaning media is presented to the tip of the optical fiber.

5. The device of claim 1 wherein:

the receptacle has means for moving the fiber; and said tool body includes means for actuating said fiber moving means such that, as said tool body enters the opening of the receptacle, the fiber moves from an operative position to a cleaning position.

* * * * *